US012568989B2

(12) United States Patent
Jain et al.

(10) Patent No.: US 12,568,989 B2
(45) Date of Patent: Mar. 10, 2026

(54) COCOA AND/OR MALT BEVERAGE PRODUCTS

(71) Applicant: SOCIETE DES PRODUITS NESTLE S.A., Vevey (CH)

(72) Inventors: Vishist Kumar Jain, Singapore (SG); Hooi Khim Teoh, Singapore (SG); Seinn Lae Waing, Singapore (SG); Edwin Ananta, Singapore (SG); Lijuan Ye, Lausanne (CH); Jeroen Andre Muller, Epalinges (CH)

(73) Assignee: Societe des Produits Nestle S.A., Vevey (CH)

( * ) Notice: Subject to any disclaimer, the term of this patent is extended or adjusted under 35 U.S.C. 154(b) by 669 days.

(21) Appl. No.: 17/754,171

(22) PCT Filed: Sep. 24, 2020

(86) PCT No.: PCT/EP2020/076683
§ 371 (c)(1),
(2) Date: Mar. 25, 2022

(87) PCT Pub. No.: WO2021/058635
PCT Pub. Date: Apr. 1, 2021

(65) Prior Publication Data
US 2022/0287321 A1 Sep. 15, 2022

(30) Foreign Application Priority Data
Sep. 27, 2019 (SG) .............................. 10201909063T

(51) Int. Cl.

| | |
|---|---|
| *A23G 1/56* | (2006.01) |
| *A23C 9/156* | (2006.01) |
| *A23C 9/16* | (2006.01) |
| *A23G 1/36* | (2006.01) |
| *A23G 1/46* | (2006.01) |
| *A23G 1/48* | (2006.01) |
| *A23L 2/38* | (2021.01) |
| *A23L 2/39* | (2006.01) |
| *A23L 2/60* | (2006.01) |

(52) U.S. Cl.
CPC ................ *A23G 1/56* (2013.01); *A23C 9/156* (2013.01); *A23C 9/16* (2013.01); *A23G 1/36* (2013.01); *A23G 1/46* (2013.01); *A23G 1/48* (2013.01); *A23L 2/382* (2013.01); *A23L 2/39* (2013.01); *A23L 2/60* (2013.01); *A23V 2002/00* (2013.01)

(58) Field of Classification Search
CPC ... A23G 1/56; A23G 1/36; A23G 1/46; A23G 1/48; A23G 1/40; A23C 9/156; A23C 9/16; A23C 11/02; A23L 2/382; A23L 2/39; A23L 2/60; A23L 2/38; A23L 2/52; A23L 27/33; A23L 29/30; A23L 33/21; A23V 2250/28; A23V 2250/606; A23V 2250/616; A23V 2250/62; A23V 2250/628; A23V 2250/18; A23V 2250/1618; A23V 2250/1578; A23V 2250/61; A23V 2250/284; A23V 2250/3202; A23V 2200/3202; A23V 2002/00
USPC ...... 426/29, 20, 28, 48; 435/101; 536/123.1; 514/54
See application file for complete search history.

(56) References Cited

U.S. PATENT DOCUMENTS

| | | | | |
|---|---|---|---|---|
| 4,765,993 A | * | 8/1988 | Owades ................... | C12G 3/00 426/29 |
| 2007/0110847 A1 | * | 5/2007 | Okamoto ................ | A23L 29/06 426/28 |
| 2007/0172931 A1 | * | 7/2007 | Harrison ................. | C12P 19/04 536/123 |
| 2011/0159145 A1 | * | 6/2011 | Alho-Lehto .............. | A23L 9/20 426/590 |
| 2017/0037387 A1 | * | 2/2017 | Cascao-Pereira .... | C12N 9/2417 |
| 2019/0133152 A1 | * | 5/2019 | Møller ................... | C12C 5/006 |
| 2019/0281874 A1 | * | 9/2019 | Davidek ................ | A21D 2/181 |

FOREIGN PATENT DOCUMENTS

| | | |
|---|---|---|
| CN | 103497983 A | 1/2014 |
| JP | 2012034654 A | 2/2012 |
| JP | 2012044989 A | 3/2012 |
| JP | 2013544527 A | 12/2013 |
| JP | 2014028773 A | 2/2014 |
| WO | 2004081022 | 9/2004 |
| WO | 2005096839 A1 | 10/2005 |
| WO | 2013164485 | 11/2013 |

OTHER PUBLICATIONS

Smith [BeerSmithTM Home Brewing Blog, Malt Extract Breer Brewing, 2008], p. 1. Web retrieved: https://beersmith.com/blog/2008/08/16/malt-extract-beer-brewing/#:~:text=Malt%20extract%20is%20made%20by,concentrated%20by%20evaporation%20under%20heat. (Year: 2008).*
Chinese Office Action for Appl No. 202080059577.3 dated Jul. 30, 2023.
Japanese Office Action for Appl No. 2022-513245 dated Aug. 19, 2025, 3 pages.

* cited by examiner

*Primary Examiner* — Erik Kashnikow
*Assistant Examiner* — Luis Eugenio Diou Berdecia
(74) *Attorney, Agent, or Firm* — K&L Gates LLP

(57) ABSTRACT
The present invention relates to cocoa and/or malt beverage products comprising isomaltooligosaccharides and methods of producing such products. The products may be reduced in sugar compared to conventional cocoa and/or malt beverage products while providing a similar sweetness, texture and taste as the conventional products.

7 Claims, No Drawings

COCOA AND/OR MALT BEVERAGE PRODUCTS

CROSS REFERENCE TO RELATED APPLICATIONS

The present application is a National Stage of International Application No. PCT/EP2020/076683, filed on Sep. 24, 2020, which claims priority to Singapore Application No. 10201909063T, filed on Sep. 27, 2019, the entire contents of which are being incorporated herein by reference.

FIELD OF THE INVENTION

The present invention relates to cocoa and/or malt beverage products comprising isomaltooligosaccharides and methods of producing such products.

BACKGROUND

Many food products traditionally comprise high amounts of sugar, which is important to achieve the sweet taste and texture the consumers expect of the product. For health reasons there is a desire to reduce the amount of sugar in many food products and to replace it with healthier ingredients like e.g. fibers, but to ensure the consumer liking of the product, it is desired to achieve this without sacrificing taste and texture. One solution is to use artificial sweeteners that provide sweetness without the energy contribution of sugar, but these do not contribute to the texture like sugar and furthermore, many consumers want to avoid artificial ingredients such as artificial sweeteners. Many food products such as e.g. cocoa and/or malt beverages traditionally comprise sucrose to achieve the desired taste and texture. For the reasons given above, there is a desire to reduce the amount of sugar, preferably replacing it with healthier ingredients, keeping the taste and texture of the original product.

Isomaltooligosaccharide is a class of short chain carbohydrates of which some are resistant towards digestion in the human intestines and may have prebiotic effects and low glycemic index.

SUMMARY OF THE INVENTION

The inventors have found that a cocoa and/or malt beverage product wherein a part of barley derived starch has been converted into isomaltooligosaccharide, can be produced with a reduced sugar content while maintaining a similar taste, sweetness and texture as a conventional full-sugar product. Accordingly, the invention relates to a cocoa and/or malt beverage powder comprising: 10-35% by weight of non-fat milk solids; 0-15% by weight of cocoa solids; 6-20% by weight of vegetable oil and/or milk fat; 0-25% by weight of sucrose; and 10-65% by weight of hydrolysed barley solids; and wherein the total amount of maltose is between 1% and 8% by weight, and the total amount of isomaltose, isomaltotriose and panose is between 2% and 10% by weight.

In another aspect, the invention relates to a liquid cocoa and/or malt beverage product comprising: 3-10% by weight of non-fat milk solids; 0-5% by weight of cocoa solids; 0.3-5% by weight of vegetable oil and/or milk fat; 0-5% by weight of sucrose; and 1-6% by weight of hydrolysed barley solids; and wherein the total amount of maltose is between 0.05% and 0.7% by weight, and the total amount of isomaltose, isomaltotriose and panose is between 0.1% and 1% by weight.

In a further aspect, the invention relates to a method of producing a cocoa and/or malt beverage product of the invention.

DETAILED DESCRIPTION OF THE INVENTION

By transglucosidase is understood one or more enzymes with enzymatic activity of enzyme class EC 3.2.1.20, also called alpha-glucosidase, which catalyses the hydrolysis of terminal, non-reducing (1→4)-linked alpha-D-glucose residues with release of alpha-D-glucose. A transglucosidase according to the invention may have only transglucosidase activity or may additionally possess one or more side activities. Especially, a transglucosidase of the invention may have activity of enzyme class EC 2.4.1.24 and catalyse the transfer of an alpha-D-glucosyl residue in a (1→4)-alpha-D-glucan to the primary hydroxy group of glucose, free or combined in a (1→4)-alpha-D-glucan, e.g. producing isomaltose from D-glucose, and panose from maltose. In a preferred embodiment of the invention, a transglucosidase has activity of both enzyme class EC 3.2.1.20 and enzyme class EC 2.4.1.24.

By alpha-amylase is understood one or more enzymes with enzymatic activity of enzyme class EC 3.2.1.1, which catalyses the endohydrolysis of (1→4)-alpha-D-glucosidic linkages in polysaccharides containing three or more (1→4)-alpha-linked D-glucose units. An alpha-amylase according to the invention may have only alpha-amylase activity or may additionally possess one or more side activities.

By pullulanase is understood one or more enzymes with enzymatic activity of enzyme class EC 3.2.1.41, which catalyses the hydrolysis of (1→6)-alpha-D-glucosidic linkages in pullulan, amylopectin and glycogen, and in the alpha- and beta-limit dextrins of amylopectin and glycogen. A pullulanase according to the invention may have only pullulanase activity or may additionally possess one or more side activities.

EC (Enzyme Committee) numbers refer to the definition of enzymatic activity and nomenclature given by the Nomenclature Committee of the International Union of Biochemistry and Molecular Biology as in force on 26 Aug. 2019.

Isomaltooligosaccharides are glucose oligomers with alpha-D-(1,6)-linkages. In the context of the present invention, the term isomaltooligosaccharide is used to describe oligosaccharides selected from the group consisting of isomaltose, isomaltotriose, panose and combinations thereof.

Cocoa and/or Malt Beverage Products

In one embodiment, the present invention relates to cocoa and/or malt beverage products. By cocoa and/or malt beverage products are meant cocoa and/or malt beverages in liquid form, which can be consumed directly; or cocoa and/or malt beverage powders, which can be used to prepare a cocoa and/or malt beverage by suspension in an aqueous liquid, such as e.g. water or milk. The cocoa and/or malt beverage products of the invention comprises non-fat milk solids, cocoa solids, vegetable oil and/or milk fat, and hydrolysed barley solids.

Non-fat milk solids may be derived from any suitable milk source, such as e.g. liquid milk, e.g. skim milk and/or whole milk, and/or milk powder, e.g. skim milk powder and/or whole milk powder. If liquid milk is used, it may be concentrated, e.g. by evaporation or filtration.

By hydrolysed barley is meant barley that has been subjected to enzymatic hydrolysis by carbohydrate degrading enzymes, e.g. alpha-amylase. The hydrolysis may be performed by the use of purified enzymes and/or enzyme preparations, or it may be performed using the endogenous enzymes of barley malt, e.g. as in a conventional mashing process, or it may be a combination of using endogenous and added enzymes. Enzyme preparations to be used may e.g. comprise alpha-amylase, cellulase, xylanase, beta-glucanase, pullulanase, proteinase and/or lipase. An example of a suitable commercially available enzyme preparation is Ondea® Pro A (Novozymes A/S, Denmark).

Cocoa solids may be from any suitable cocoa source, e.g. in the form of cocoa powder, cocoa mass and/or cocoa butter. Vegetable oil may be any suitable vegetable oil, preferably palm oil. Milk fat may be derived from any suitable milk source, such as e.g. liquid milk or cream, e.g. skim milk, cream, and/or whole milk, and/or milk powder, e.g. skim milk powder, cream powder, and/or whole milk powder, and/or may be in the form of butter, butter oil and/or anhydrous milk fat. If liquid milk or cream is used, it may be concentrated, e.g. by evaporation or filtration.

A cocoa and/or malt beverage powder of the invention may comprise sucrose. Due to the amounts of glucose and isomaltooligosaccharides present in the product, the amount of sucrose may be reduced as compared to a conventional cocoa and/or malt beverage powder while retaining an acceptable taste, sweetness and texture. In a preferred embodiment, a cocoa and/or malt beverage product of the invention does not comprise sucrose. In another preferred embodiment, a cocoa and/or malt beverage powder of the invention comprises 1-25% by weight of sucrose, more preferably 5-20% by weight of sucrose.

A cocoa and/or malt beverage powder of the invention may comprise any other suitable ingredients known in the art, such as e.g. vitamins, minerals, buffer salts, emulsifiers and stabilizers.

A cocoa and/or malt beverage powder of the invention may be produced by any suitable method known in the art. The ingredients may e.g. be in powder form and mixed in the dry state, some or all ingredients may be mixed in aqueous solution/suspension and subsequently dried to a powder, or some or all powdered ingredients may e.g. be co-agglomerated to produce a powder with improved solubility.

Cocoa and/or Malt Beverage Powder

In one embodiment, the cocoa and/or malt beverage product of the invention is a cocoa and/or malt beverage powder comprising: 10-35% by weight of non-fat milk solids; 0-15% by weight of cocoa solids; 6-20% by weight of vegetable oil and/or milk fat; 0-25% by weight of sucrose; and 10-65% by weight of hydrolysed barley solids; and wherein the total amount of maltose is between 1% and 8% by weight, and the total amount of isomaltose, isomaltotriose and panose is between 2% and 10% by weight.

In a preferred embodiment, a cocoa and/or malt beverage powder of the invention comprises 10-50% by weight of hydrolysed barley solids, more preferably 10-40% by weight of hydrolysed barley solids, and even more preferably 15-30% by weight of hydrolysed barley solids.

A cocoa and/or malt beverage powder of the invention may comprise sucrose. Due to the amounts of glucose and isomaltooligosaccharides present in the product, the amount of sucrose may be reduced as compared to a conventional cocoa and/or malt beverage powder while retaining an acceptable taste, sweetness and texture. In a preferred embodiment, a cocoa and/or malt beverage product of the invention does not comprise sucrose. In another preferred embodiment, a cocoa and/or malt beverage powder of the invention comprises 1-25% by weight of sucrose, more preferably 5-20% by weight of sucrose.

In a preferred embodiment, a cocoa and/or malt beverage powder of the invention comprises between 3% and 7% by weight of maltose. In another preferred embodiment, a cocoa and/or malt beverage powder of the invention comprises between 2% and 8% by weight of isomaltose, isomaltotriose and panose.

In a further preferred embodiment, the invention relates to a cocoa and/or malt beverage powder comprising: 10-35% by weight of non-fat milk solids; 0-15% by weight of cocoa solids; 6-20% by weight of vegetable oil and/or milk fat; 5-20% by weight of sucrose; and 10-40% by weight of hydrolysed barley solids; and wherein the total amount of maltose is between 3% and 7% by weight, and the total amount of isomaltose, isomaltotriose and panose is between 2% and 8% by weight.

Liquid Cocoa and/or Malt Beverage Product

In one embodiment, the cocoa and/or malt beverage product of the invention is a liquid cocoa and/or malt beverage product comprising: 3-10% by weight of non-fat milk solids; 0-5% by weight of cocoa solids; 0.3-5% by weight of vegetable oil and/or milk fat; 0-5% by weight of sucrose; and 1-6% by weight of hydrolysed barley solids; and wherein the total amount of maltose is between 0.05% and 0.7% by weight, and the total amount of isomaltose, isomaltotriose and panose is between 0.1% and 1% by weight.

In a preferred embodiment, a liquid cocoa and/or malt beverage product of the invention comprises 1-5% by weight of hydrolysed barley solids, more preferably 1-4% by weight of hydrolysed barley solids, and even more preferably 1.5-3% by weight of hydrolysed barley solids.

A liquid cocoa and/or malt beverage product of the invention may comprise sucrose. Due to the amounts of glucose and isomaltooligosaccharides present in the product, the amount of sucrose may be reduced as compared to a conventional liquid cocoa and/or malt beverage product while retaining an acceptable taste, sweetness and texture. In a preferred embodiment, a liquid cocoa and/or malt beverage product of the invention does not comprise sucrose. In another preferred embodiment, a liquid cocoa and/or malt beverage product of the invention comprises 1-5% by weight of sucrose, more preferably 2-4% by weight of sucrose.

In a preferred embodiment, a liquid cocoa and/or malt beverage product of the invention comprises between 0.1% and 0.5% by weight of maltose. In another preferred embodiment, a liquid cocoa and/or malt beverage product of the invention comprises between 0.1% and 0.8% by weight of isomaltose, isomaltotriose and panose.

In a further preferred embodiment, the invention relates to a liquid cocoa and/or malt beverage product comprising: 3-10% by weight of non-fat milk solids; 0-5% by weight of cocoa solids; 0.3-5% by weight of vegetable oil and/or milk fat; 0-5% by weight of sucrose; and 1-4% by weight of hydrolysed barley solids; and wherein the total amount of maltose is between 0.1% and 0.5% by weight, and the total amount of isomaltose, isomaltotriose and panose is between 0.1% and 0.8% by weight.

Method

In one embodiment, the invention relates to a method of producing a coca and/or malt beverage product of the invention. The method comprises the following steps:

Barley to be used in the method of the invention may e.g. be in the form of green barley and/or barley malt. The green barley or barley malt may be treated in any suitable way to facilitate the hydrolysis, usually it will be crushed or ground to increase the surface area and facilitate the access of the alpha-amylase to the substrate. The barley to be hydrolysed may be combined with one or more adjuncts such as e.g. starches of tapioca, cassava, maize or rice, the slurry to be hydrolysed by alpha-amylase may e.g. comprise 30-70% by dry weight of adjunct, e.g. 30-70% of tapioca starch.

The slurry of barley is hydrolysed with alpha-amylase. The hydrolysis of the barley slurry may be performed by adding alpha-amylase to the slurry, e.g. in the form of pure alpha-amylase or in the form of an enzyme preparation comprising alpha-amylase. It may also be performed by using barley malt for the slurry. Barley malt contains endogenous alpha-amylase, as well as other carbohydrate degrading enzymes, which is allowed to react with carbohydrates of the barley malt in the slurry. The purpose of the hydrolysis is to transform starch contained in the barley into lower molecular carbohydrates and sugars, such as e.g. glucose, fructose, maltose and maltotriose.

If alpha-amylase is added as an enzyme preparation, the enzyme preparation may comprise further enzyme activities, e.g. cellulase, xylanase, beta-glucanase, pullulanase, proteinase and/or lipase. The pH of the barley may be adjusted before the contacting with an enzyme preparation comprising alpha-amylase, the pH may e.g. be lowered, e.g. to a pH in the range of pH 4.8-5.1. pH adjustment may be performed in any suitable way, e.g. by addition of a base, e.g. sodium hydroxide, and/or calcium chloride.

Barley malt is barley grain that has undergone a germination step wherein endogenous enzymes, including alpha-amylase, have been formed. These enzymes are able to degrade high molecular weight substances such as starch, protein and fat into low molecular substances such as sugars, mainly comprising glucose, fructose, maltose and maltotriose, amino acids and fatty acids. If barley malt is used, it may be treated in any suitable way to induce the hydrolysis. Hydrolysis of barley malt, also known as "mashing" is a well-known process e.g. used in brewing and production of malt extract.

A transglucosidase is added to the slurry of barley in aqueous liquid to produce isomaltooligosaccharides and glucose. Any suitable transglucosidase may be used such as e.g. a transglucosidase from *Aspergillus niger* such as e.g. Transglucosidase L "Amano" (Amano Enzyme Inc., Japan). The addition may be performed at any suitable temperature and for any suitable time, taking the characteristics of the transglucosidase into consideration. The addition to the slurry of transglucosidase may be performed before, during and/or after hydrolysing the slurry with alpha-amylase. In a preferred embodiment, the addition of transglucosidase to the slurry is performed after starting hydrolysis with alpha-amylase. In a preferred embodiment, the addition of transglucosidase is performed 10-60 minutes after the start of the hydrolysis with alpha-amylase.

The temperature of the slurry may be changed between the start of the hydrolysis with alpha-amylase and the addition of transglucosidase. In a preferred embodiment, the temperature of the slurry is increased by 5-30° C. after the start of the hydrolysis with alpha-amylase before the addition of transglucosidase.

After the hydrolysis with alpha-amylase and the reaction with transglucosidase has progressed to the desired degree, the enzymatic reactions may be stopped, e.g. by inactivating the enzymes. In a preferred embodiment, the temperature of the slurry is increased to between 70 and 90° C. after the addition of transglucosidase to inactivate the enzymes.

In one embodiment, the hydrolysis with alpha-amylase is started before the addition of transglucosidase and the temperature of the slurry during the hydrolysis with alpha-amylase before the addition of transglucosidase is between 45 and 60° C.

Spent grain is removed from the slurry to produce a wort. The spent grain may be removed by any suitable method, e.g. by filtration or centrifugation. The spent grain may be removed before or after adding transglucosidase, i.e. the transglucosidase reaction may be performed while the spent ground is present and/or after it has been removed. The wort may be concentrated, e.g. by evaporation and/or filtration, and may additionally be dried, e.g. by spray drying or roller drying. Transglucosidase may be added before or after concentration. Transglucosidase may also be added after drying, in this case the dried wort is suspended in an aqueous liquid at suitable conditions for the transglucosidase to be active.

The wort may be combined with other ingredients before further processing, for example, the wort may be combined with hydrolysed starch, e.g. hydrolysed tapioca starch.

The wort is combined with non-fat milk solids, cocoa solids, vegetable oil and/or milk fat, and optionally sucrose and other ingredients, to obtain a cocoa and/or malt beverage product. This may be done by any methods known in the art. The ingredients may be combined in dry form or liquid form, some ingredients may be in dry form and some in liquid form. In one embodiment, the wort constitute between 20 and 65% by weight of dry solids of the final cocoa and/or malt beverage product.

If the final product is a liquid cocoa and/or malt beverage product, the water content of the final mixture may be adjusted to achieve the final desired solids content in any suitable way, e.g. by addition of water. The product may be heat treated to improve shelf stability, e.g. by pasteurisation, UHT treatment, or sterilisation, and packed in suitable containers.

If the final product is a cocoa and/or malt beverage powder, the ingredients may e.g. be in powder form and mixed in the dry state, some or all ingredients may be mixed in aqueous solution/suspension and subsequently dried to a powder, or some or all powdered ingredients may e.g. be co-agglomerated to produce a powder with improved solubility.

EXAMPLES

Example 1

A slurry of barley grist in water was prepared and heated to 45-60° C. and an enzyme preparation (Ondea® Pro A, Novozymes A/S, Denmark) comprising alpha-amylase, pullulanase, cellulase, xylanase, protease and lipase was added and allowed to react. Transglucosidase (Transglucosidase L "Amano", Amano Enzyme Inc., Japan) was added and the temperature was increased to 60-80° C. After the transglucosidase was allowed to react, the temperature was raised to above 80° C. to inactivate the enzymes, and the slurry was filtered through a filter press to remove the spent grain and produce a wort. The wort was mixed with the same weight of hydrolysed tapioca starch. The wort was used to produce a cocoa and malt beverage powder with the composition given in table 1. A reference cocoa and malt beverage powder was produced in the same way with the same composition, except that malt extract was used instead of the wort from hydrolysed and transglucosidase treated barley. The sugar composition of the product and the reference is given in table 2. It is seen that the content of sugar (mono- and disaccharides) is reduced by more than 14% by weight as compared with the reference product. The product and the reference was reconstituted and tested by a sensory panel and were found to have similar sweetness, taste and texture.

TABLE 1

Composition of cocoa and malt beverage powder of example 1.

| | % by weight of dry matter |
|---|---|
| Wort from hydrolysed and transglucosidase treated barley | 41 |
| Palm Oil | 12 |
| Sucrose | 15 |
| Skimmed Milk Powder | 21 |
| Cooca Powder 10-12% Fat | 10 |
| Dicalcium Phosphate | 1 |

TABLE 2

Sugar composition of cocoa and malt beverage powder and reference of example 1.

| % by weight of dry matter | Product of example 1 | Reference |
|---|---|---|
| Glucose | 2.49 | 1.95 |
| Sucrose | 15.01 | 16.46 |
| Fructose | <0.40 | <0.4 |
| Isomaltose | 0.56 | <0.4 |
| Isomaltotriose | 0.89 | 0.76 |
| Maltose | 6.48 | 10.29 |
| Panose | 1.53 | <0.40 |
| Sugar (mono- and disaccharides) | 24.94 | 29.10 |

The invention claimed is:

1. A method of producing a cocoa and/or malt beverage product comprising:
   a) suspending barley in an aqueous liquid to produce a slurry;
   b) hydrolysing the slurry of step a) with alpha-amylase;
   c) adding transglucosidase and allowing the transglucosidase to react;
   d) removing spent grain from the slurry after performing step b) to obtain a wort; and
   e) combining the wort obtained in step d) with non-fat milk solids, cocoa solids, and sucrose, vegetable oil and/or milk fat to obtain a cocoa and/or malt beverage powder, or optionally a liquid suspension; and wherein step c) is performed before, during and/or after step b), and before, during and/or after step d),
   wherein the cocoa and/or malt beverage product has one of the following compositions:
   (i) 10-35% by weight of non-fat milk solids;
   0-15% by weight of cocoa solids;
   6-20% by weight of vegetable oil and/or milk fat;
   0-25% by weight of sucrose; and
   10-65% by weight of hydrolysed barley solids; and
   wherein the total amount of maltose is between 1% and 8% by weight, the total combined amount of isomalt- ose, isomaltotriose and panose is between 2% and 10% by weight, and a total combined amount of glucose, sucrose, fructose, maltose and isomaltose is between 20% and 40% by weight; or
   (ii) 3-10% by weight of non-fat milk solids;
   0-5% by weight of cocoa solids;
   0.3-5% by weight of vegetable oil and/or milk fat;
   0-5% by weight of sucrose; and
   1-6% by weight of hydrolysed barley solids; and
   wherein the total amount of maltose is between 0.05% and 0.7% by weight, the total combined amount of isomalt- ose, isomaltotriose and panose is between 0.1% and 1% by weight, and a total combined amount of glucose, sucrose, fructose, maltose and isomaltose is between 1% and 3.5% by weight.

2. The method of claim 1, wherein the enzyme preparation of step b) further comprises, cellulase, xylanase, beta-glu- canase, pullulanase, proteinase and/or lipase.

3. The method of claim 1, wherein step c) is started 10-60 minutes after the start of step b).

4. The method of claim 1, wherein the temperature of the slurry is increased by 5-30° C. after the start of step b), before the start of step c).

5. The method of claim 1, wherein the temperature of the slurry is increased to between 7° and 90° C. after step c) to inactivate the enzymes.

6. The method of claim 1, wherein step b) is started before step c) and the temperature of the slurry during step b) before the start of step c) is between 45 and 60°.

7. The method of claim 1, wherein the wort obtained in step d) constitute between 20 and 65% by weight of dry solids of the final cocoa and/or malt beverage powder obtained in step e).

* * * * *